United States Patent
Jung et al.

(10) Patent No.: US 12,389,468 B1
(45) Date of Patent: Aug. 12, 2025

(54) METHODS FOR SUPPORTING CONNECTION BETWEEN DEVICES SERVING ON DIFFERENT CHANNELS AND DEVICE THEREOF

(71) Applicant: Dialog Semiconductor Korea Inc., Gyeonggi-do (KR)

(72) Inventors: Jiyoung Jung, Seoul (KR); Changhawn Park, Suwon-si (KR); Munchang Jung, Yongin-si (KR); Jumhyuk Jang, Gwangmyeong-si (KR)

(73) Assignee: Renesas Design Korea Inc., Seongnam-si (KR)

( * ) Notice: Subject to any disclaimer, the term of this patent is extended or adjusted under 35 U.S.C. 154(b) by 213 days.

(21) Appl. No.: 17/399,630

(22) Filed: Aug. 11, 2021

(51) Int. Cl.
*H04W 76/14* (2018.01)
*H04W 72/121* (2023.01)
*H04W 76/40* (2018.01)
H04W 84/18 (2009.01)

(52) U.S. Cl.
CPC ......... *H04W 76/14* (2018.02); *H04W 72/121* (2013.01); *H04W 76/40* (2018.02); *H04W 84/18* (2013.01)

(58) Field of Classification Search
CPC ... H04W 76/14; H04W 76/40; H04W 72/121; H04W 84/18
See application file for complete search history.

(56) References Cited

U.S. PATENT DOCUMENTS

| | | | |
|---|---|---|---|
| 8,817,682 B1* | 8/2014 | Goel | H04W 52/0206 370/311 |
| 2003/0002456 A1* | 1/2003 | Soomro | H04W 72/02 370/328 |
| 2004/0146022 A1* | 7/2004 | Lewis | H04W 36/06 455/436 |
| 2014/0016568 A1* | 1/2014 | Koskela | H04W 52/0219 370/329 |
| 2014/0321415 A1* | 10/2014 | You | H04W 36/06 370/329 |
| 2015/0139203 A1* | 5/2015 | Miryala | H04W 8/005 370/338 |
| 2015/0341856 A1* | 11/2015 | Nord | H04W 76/14 455/426.1 |
| 2021/0212156 A1* | 7/2021 | Kwon | H04W 88/06 |
| 2023/0042022 A1* | 2/2023 | Miao | H04W 48/16 |
| 2023/0284107 A1* | 9/2023 | Gan | H04L 41/082 370/331 |

FOREIGN PATENT DOCUMENTS

WO    WO-03005643 A1 *    1/2003    ............ H04W 72/02

* cited by examiner

*Primary Examiner* — Michael J Moore, Jr.
(74) *Attorney, Agent, or Firm* — Saile Ackerman LLC; Stephen B. Ackerman (57) ABSTRACT

The present disclosure provides a method for supporting a connection between devices serving on different channels, and a device serving on a first channel and supporting connection with a counterpart device serving on a second channel different from the first channel. The device includes a transceiver and a processor configured to control the transceiver. The processor is configured to broadcast a first beacon frame over the first channel, to generate a second beacon frame including information on the first channel, and to broadcast the second beacon frame over the second channel.

8 Claims, 6 Drawing Sheets

METHODS FOR SUPPORTING CONNECTION BETWEEN DEVICES SERVING ON DIFFERENT CHANNELS AND DEVICE THEREOF

TECHNICAL FIELD

The present disclosure in some embodiments relates to a method for supporting a connection between devices serving on different channels and a device thereof.

BACKGROUND

The statements in this section merely provide background information related to the present disclosure and do not necessarily constitute prior art.

To make a connection between two or more mesh points (MPs) in a mesh communication system, the mesh profiles need to be equal to each other. The MPs have at least one mesh profile which may include a mesh identifier (ID) and the like.

An MP may identify mesh profiles of other MPs by using beacon frames transmitted from other MPs. In other words, the MP may receive beacon frames periodically transmitted from other MPs, identify mesh profiles of other MPs, and make a connection with at least one MP having the same mesh profile among the other MPs.

However, the MP transmits a beacon frame only over one fixed channel. Unlike a station (STA) that listens to beacon frames while switching between channels, the MP does not perform a channel scanning.

This means that the MPs serving on different channels cannot connect to each other, even if the MPs have the same mesh profile.

SUMMARY

According to at least one embodiment, the present disclosure provides a method for a device serving on a first channel to connect itself with a counterpart device serving on a second channel different from the first channel, broadcasting a first beacon frame over the first channel, generating a second beacon frame including information on the first channel, and broadcasting the second beacon frame over the second channel.

According to another embodiment, the present disclosure provides a method for a device serving on a second channel to connect itself with a counterpart device serving on a first channel different from the second channel, including receiving a beacon frame over the second channel, performing a channel switching to the first channel based on information included in the beacon frame, and establishing a connection with the counterpart device on the first channel.

According to yet another embodiment, the present disclosure provides a device serving on a first channel and supporting connection with a counterpart device serving on a second channel different from the first channel, the device including a transceiver and a processor configured to control the transceiver, wherein the processor is configured to broadcast a first beacon frame over the first channel, to generate a second beacon frame including information on the first channel, and to broadcast the second beacon frame over the second channel.

According to yet another embodiment, the present disclosure provides a device serving on a second channel and supporting connection with a counterpart device serving on a first channel different from the second channel, the device including a transceiver and a processor configured to control the transceiver, wherein the processor is configured to receive a beacon frame over the second channel, to perform a channel switching to the first channel that is different from the second channel based on information included in the beacon frame, and to establish a connection with the counterpart device on the first channel.

REFERENCE NUMERALS

50: first device 52: second device
500: transceiver 502: processor
504: memory 520: transceiver
522: processor 524: memory

DESCRIPTION

The present disclosure in some embodiments seeks to provide, in a communication system utilizing beacon frames as connecting indicators, a method for supporting a connection between devices using different channels and a device for carrying out the same method.

Hereinafter, at least one embodiment of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to one or more units for processing at least one function or operation, which may be implemented by hardware, software, or a combination particular.

The detailed description, which will be given below with reference to the accompanying drawings, is intended to explain exemplary embodiments of the present disclosure and is not intended to represent the only embodiments in which the present disclosure may be practiced.

Various embodiments of the present disclosure will be described using a mesh communication system composed of a plurality of mesh points (MPs) as an example. However, this is for the purpose of description, and the present disclosure can be extended to various other systems using a beacon frame as a connecting indicator, such as a wireless local area network (WLAN) communication system.

Hereinafter, various terms used in the present disclosure may be described with reference to IEEE 802.11, a technical specification related to a wireless LAN, which is for the purpose of description and does not limit the various embodiments of the present disclosure.

Figure 1:
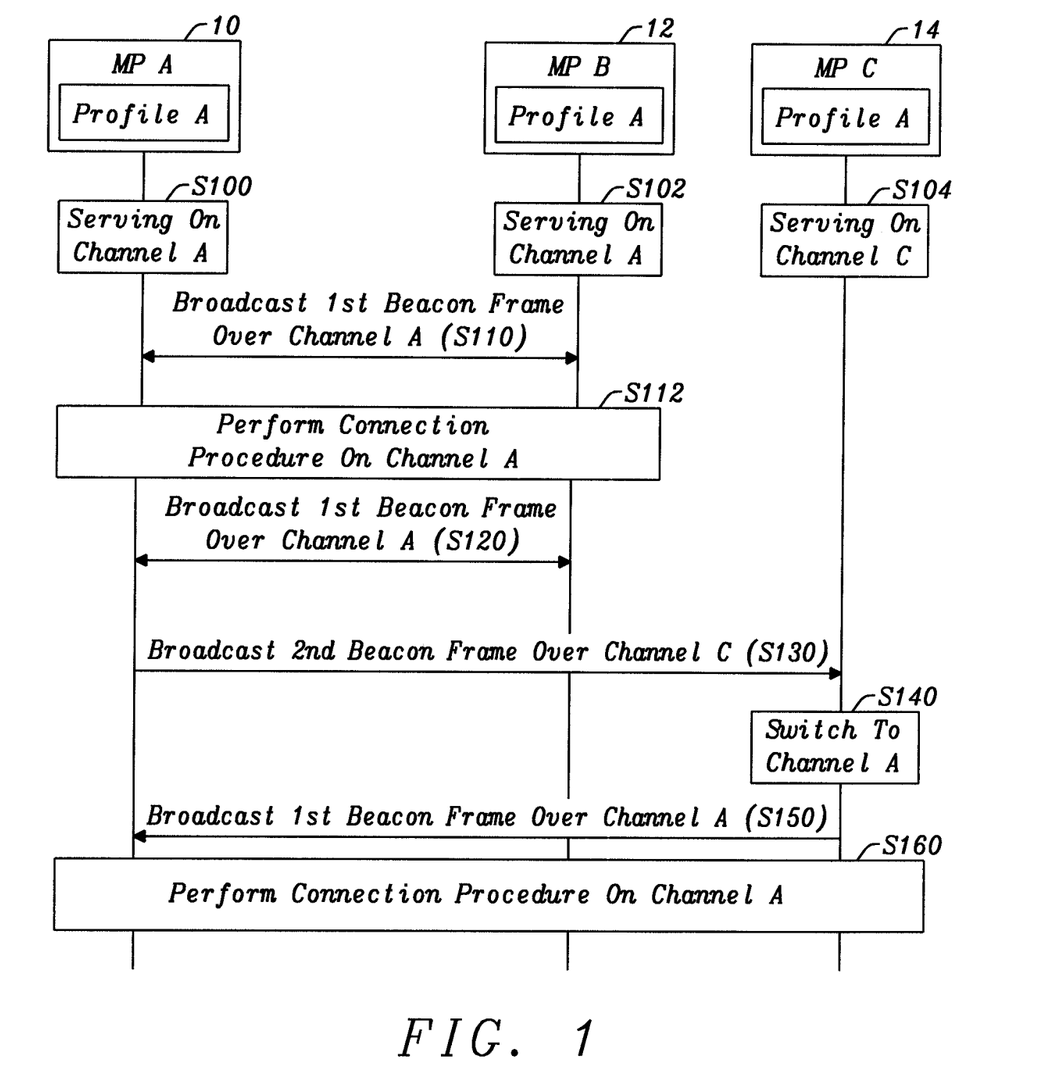
FIG. 1 is a flowchart of a method of connecting between devices serving on different channels according to at least one embodiment of the present disclosure.

FIG. 1 is a flowchart of a method of connecting between devices serving on different channels according to at least one embodiment of the present disclosure.

Mesh points (MPs) are provided, including an MP A 10, an MP B 12, and an MP C 14, all of which share the same mesh profile. The MP A 10 and the MP B 12 are serving on a channel A (S100 and S102), and the MP C 14 is serving on a channel C (S104).

The MP A 10 and the MP B 12 broadcast a beacon frame over channel A at preset first time interval (S110 and S120). Here, the first time interval may be a Delivery Traffic Indication Map interval (DTIM interval). According to some embodiments, the first time interval may be different or the same for each of the MPs 10, 12, and 14.

Hereinafter, for clarity of the difference from the beacon frame to be described below at Step S130, a first beacon frame refers to a beacon frame excluding the channel switch information element, and a second beacon frame refers to a beacon frame including the channel switch information element. The first beacon frame may be, but is not limited to, a known beacon frame.

The MP A 10 and the MP B 12 in receipt of the first beacon frame discover each other having the same mesh profile and perform a connection procedure on channel A (S112). Meanwhile, since the technology of the connection procedure performed between MPs having the same mesh profile is common in the relevant field, a detailed description thereof will not be provided.

The MP A 10 and/or the MP B 12 broadcast a second beacon frame over channel C at preset second time interval (S130). Here, the second beacon frame may include an information element (hereinafter, a channel switch information element) instructing an MP that received the second beacon frame to perform a channel switching. According to some embodiments, the second time interval may be different or the same for each of the MPs 10, 12, and 14.

Meanwhile, the MP A 10 and/or the MP B 12 temporarily switch to channel C to broadcast the second beacon frame at the second time interval, but the connection between MP A 10 and MP B 12 is maintained. In other words, the MP A 10 and the MP B 12 can transmit and receive data over channel A.

Upon receiving the second beacon frame, MP C 14 discovers MP A 10 and/or MP B 12 having the same mesh profile as the mesh profile of itself and switches channels into channel A (S140). To this end, MP C 14 may check information of the target channel to switch over, i.e., channel A, from the second beacon frame. For example, MP C 14 may obtain information of the frequency of channel A from a direct sequence parameter (DS parameter) included in the second beacon frame.

The MP C 14 broadcasts the first beacon frame over channel A (S150).

The MP A 10 and/or the MP B 12 having received the first beacon frame discover the MP C 14 having the same mesh profile as the mesh profile of the themselves and perform a connection procedure on channel A (S160).

As described above, the MP A 10 and/or the MP B transmit the second beacon frame at the second time interval over the other channel (hereinafter, 'second channel') than the channel where the MP A 10 and/or the MP B provide service (hereinafter, 'first channel') in order to notify the presence of the MP A 10 and/or the MP B to the MP C 14 in service on the second channel and in order to instruct the MP C 14 to switch channels to the first channel.

Figure 2:
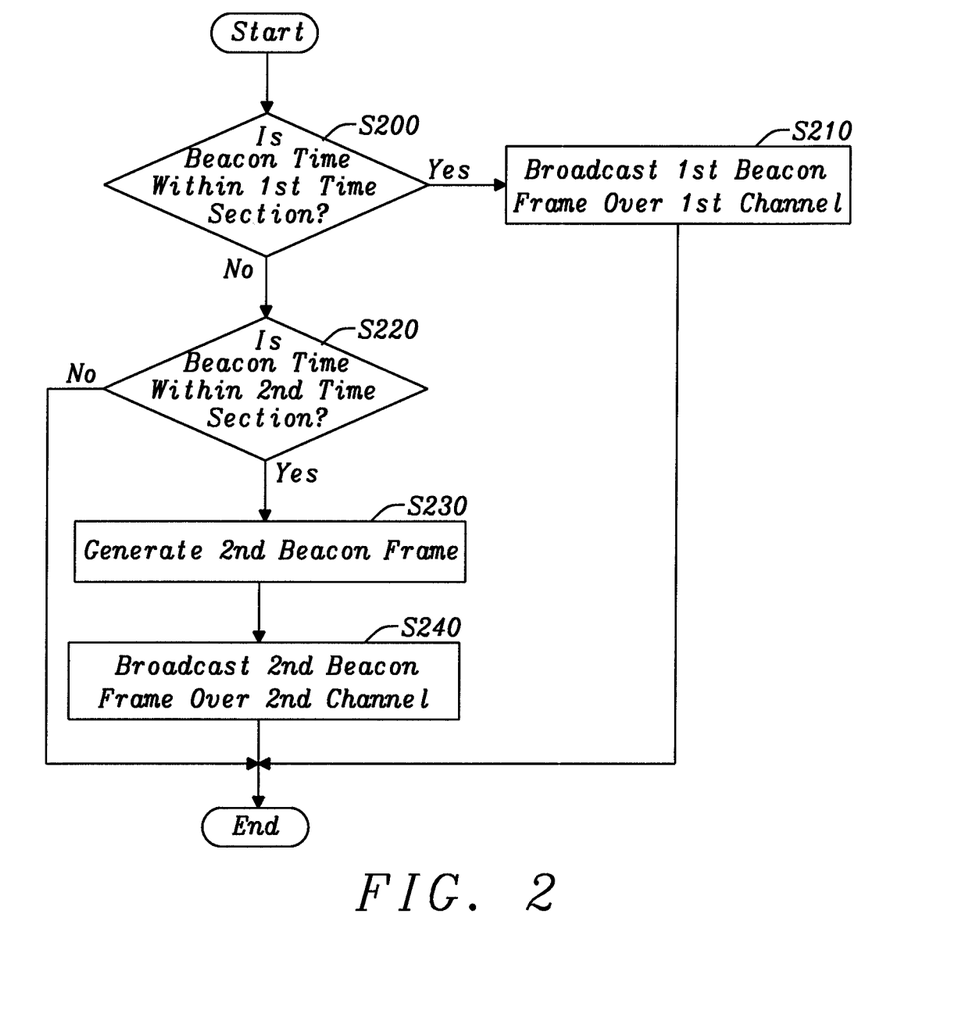
FIG. 2 is a flowchart of a method of transmitting beacon frames according to at least one embodiment of the present disclosure.

FIG. 2 is a flowchart of a method of transmitting beacon frames according to at least one embodiment of the present disclosure.

Figure 3A:
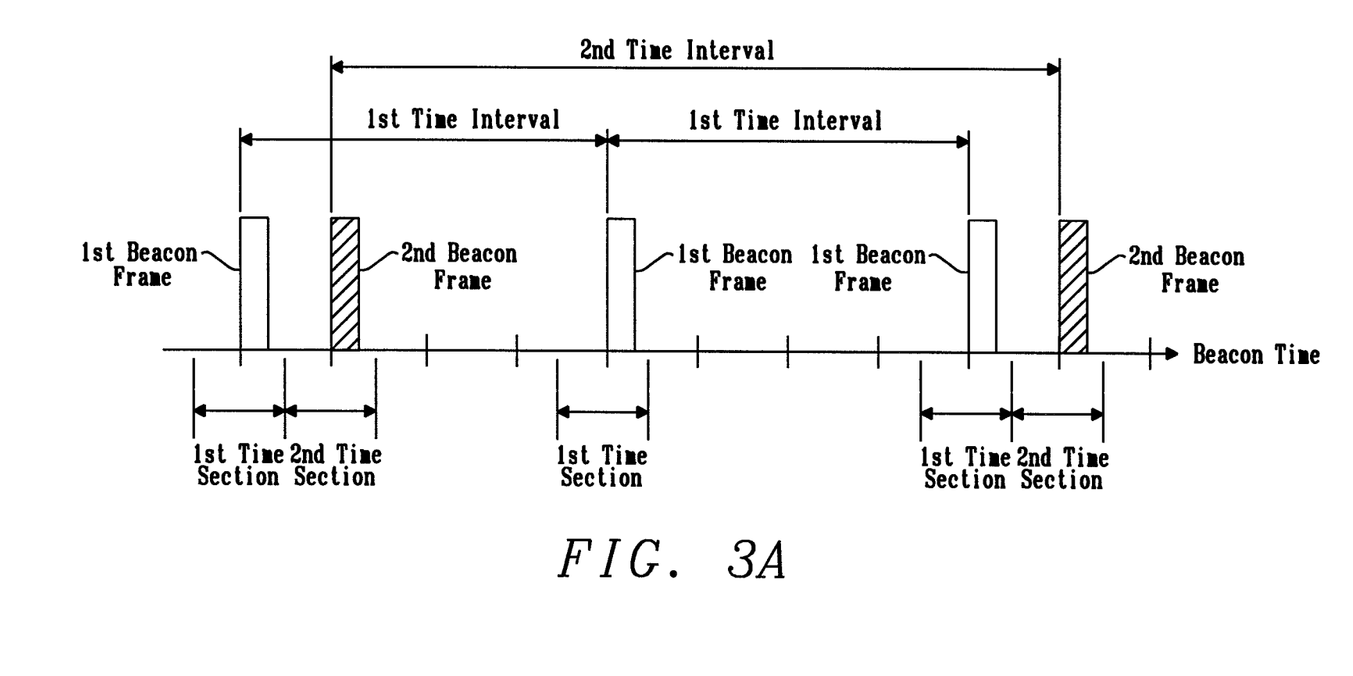
FIG. 3A is an example diagram for describing the transmission timing of beacon frames according to at least one embodiment of the present disclosure.

FIG. 3A is an example diagram for describing the transmission timing of beacon frames according to at least one embodiment of the present disclosure.

Figure 3B:
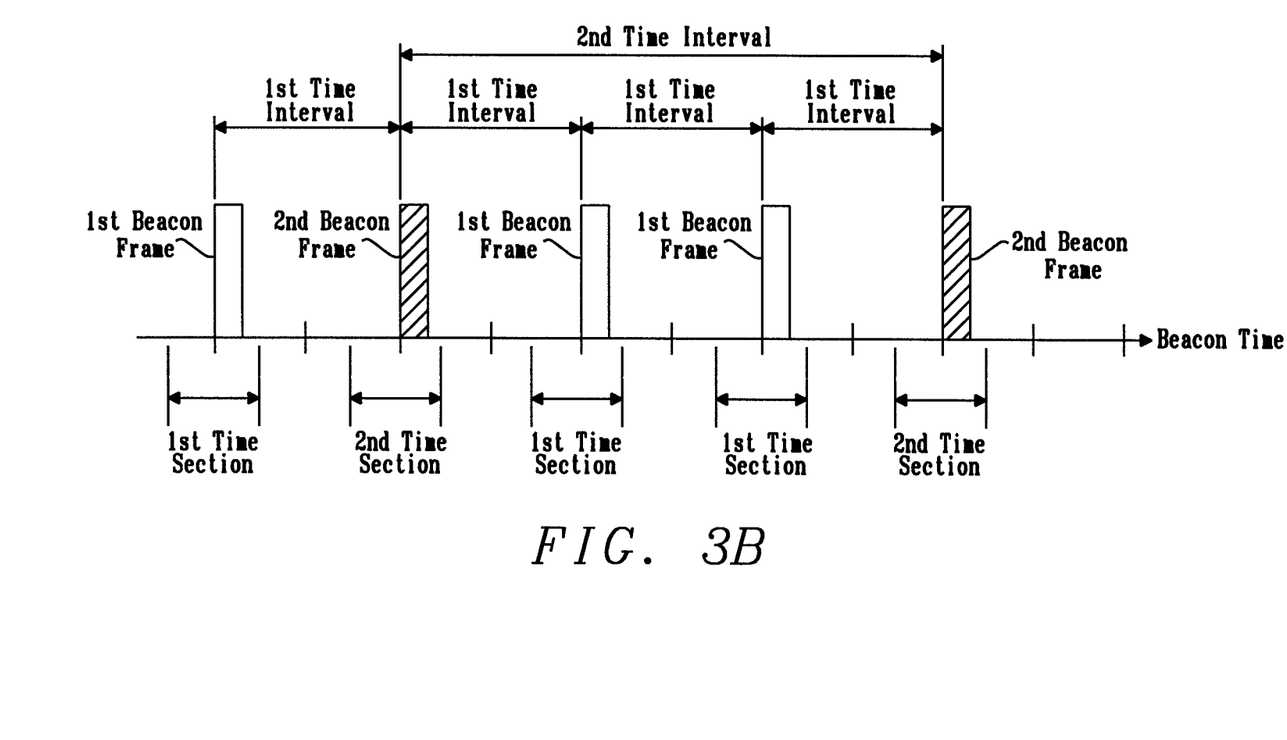
FIG. 3B is an example diagram for describing the transmission timing of beacon frames according to another embodiment of the present disclosure.

FIG. 3B is an example diagram for describing the transmission timing of beacon frames according to another embodiment of the present disclosure.

Per every beacon time, an MP determines whether the beacon time is within a first time section (S200). The first time section may be set for each first time interval. Here, the first time interval may be the DTIM interval. In other words, the first time section may be set based on the transmission time of a DTIM. For example, as shown in FIG. 3A, the first time section may be set to include one beacon time or DTIM transmission time per DTIM interval.

Upon confirming that the beacon time is within the first time section, the MP broadcasts the first beacon frame over the first channel (S210).

If determined that the beacon time is not within the first time section, the MP determines on whether the beacon time is within a second time section (S220). Here, the second time section may be set to be different from the first time section, and the second time section may be set for each preset interval.

As shown in FIG. 3A, according to at least one embodiment of the present disclosure, the second time section may be set to include at least one beacon time existing between the plural first time sections. Accordingly, the MP may transmit the second beacon frame while maintaining the transmission interval of the first beacon frame (e.g., DTIM interval). Meanwhile, as shown in FIG. 3B, according to another embodiment of the present disclosure, the second time section may be set to replace the first time section per the second time interval. Here, the second time interval may be set to an integer multiple of the first time interval. Accordingly, the MP may transmit the first beacon frame or the second beacon frame at each first time interval.

According to some embodiments, the second time section and/or the second time interval may be set based on at least one of the number of the remaining channels other than the first channel and the length of the first time interval and/or the first time section. Further, the second time section may be set for each of the remaining channels except the first channel. For example, supposing that there are three channels A, B, and C, of which the MP provides its service on channel A, the second time section corresponding to channel B may be set to include the first beacon time after the first time section, and the second time section corresponding to channel C may be set to include the second beacon time after the first time section.

Upon confirming that the beacon time is within the second time section, the MP generates a second beacon frame by adding a channel switch information element to the first beacon frame (S230). The channel switch information element may include information on instructing the counterpart MP which received the second beacon frame to switch itself to the first channel. To this end, the second beacon frame may include information on the first channel. The information on the first channel may be a frequency information (e.g., a channel number) of the first channel, which is included in the DS parameter.

The MP broadcasts the second beacon frame over the second channel (S240). Here, the second channel may be a channel that corresponds to the second time section among the remaining channels except for the first channel. For example, in the aforementioned example, where the beacon time is within the second time section corresponding to channel B, the MP may broadcast the second beacon frame over channel B. Additionally, where the beacon time is within the second time section corresponding to channel C, the MP may broadcast the second beacon frame over channel C.

As described above, the MP may broadcast the first beacon frame over the first channel during the first time section and broadcast the second beacon frame over the second channel during the second time section.

Although the first time section and the second time section include only one beacon time for illustrative purpose in FIGS. 3A and 3B, the first time section and/or the second time section may be set to include a plurality of beacon times.

Figure 4:
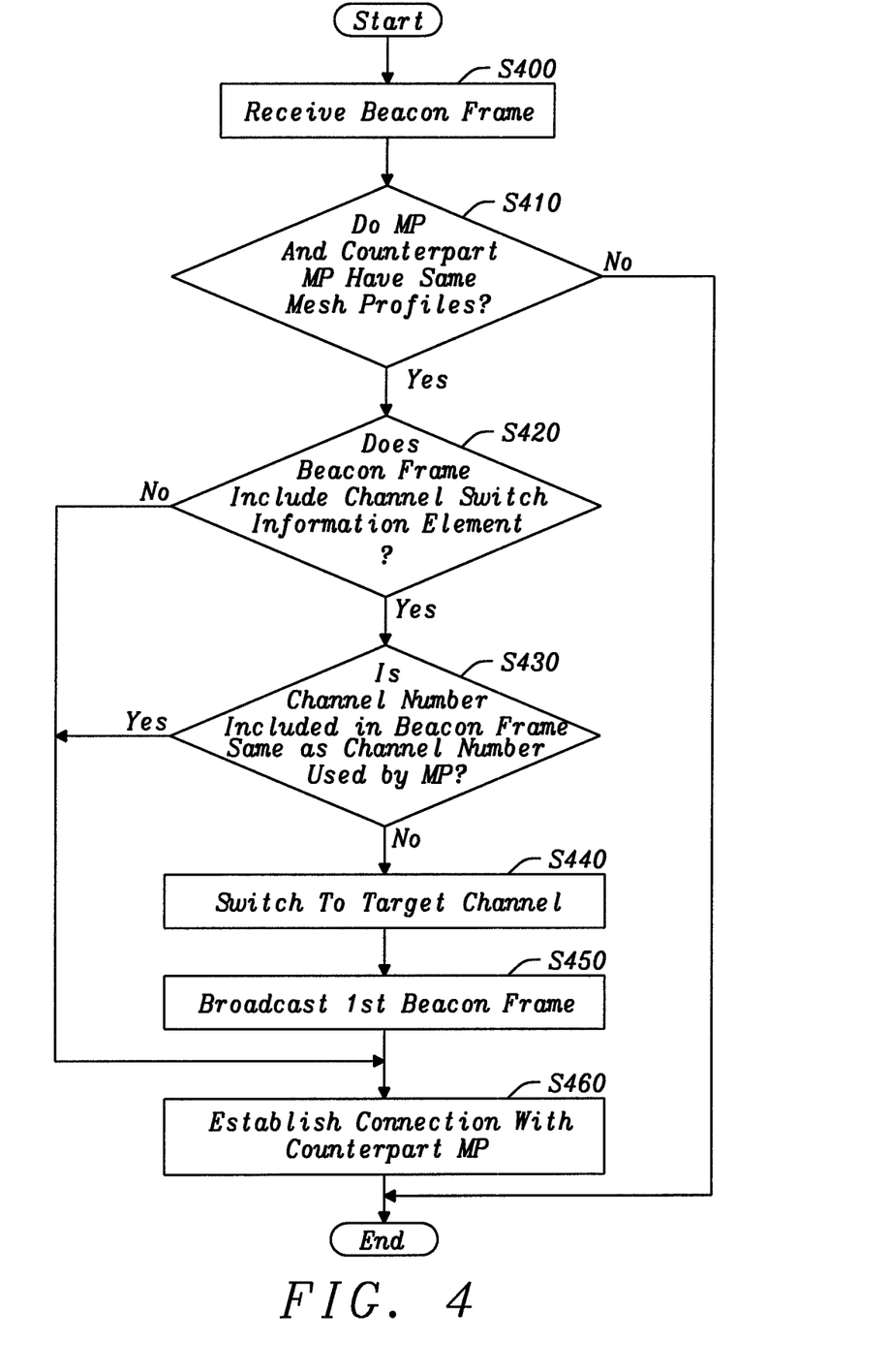
FIG. 4 is a flowchart of a method of receiving beacon frames according to at least one embodiment of the present disclosure.

FIG. 4 is a flowchart of a method of receiving beacon frames according to at least one embodiment of the present disclosure.

An MP receives a beacon frame over a channel on which the MP is providing its service (S400). The MP may obtain, based on information included in the beacon frame, the mesh profile of a counterpart MP that has transmitted the beacon frame.

The MP determines on whether the MP and the counterpart MP have the same mesh profile (S410).

Upon confirming that the MP and the counterpart MP have the same mesh profile, the MP determines whether the beacon frame includes an information element instructing a channel switching (S420). In other words, the MP may determine whether the beacon frame is the first beacon frame or the second beacon frame.

Upon confirming that the beacon frame includes the information element instructing the channel switching, the MP determines whether the channel number included in the beacon frame is the same as the channel number of the channel currently used by the MP (S430). Here, the channel number included in the beacon frame may be a current channel field value of a direct sequence (DS) parameter included in the beacon frame.

Upon confirming that the channel number included in the beacon frame is not the same as the channel number of the channel currently used by the MP, the MP performs a channel switching based on the information included in the beacon frame (S440). For example, the MP may switch channels to a target channel according to the channel number included in the beacon frame.

The MP broadcasts the beacon frame over the target channel (S450) and establishes a connection with the counterpart MP on the target channel (S460).

Upon confirming that the beacon frame does not include the information element instructing the channel switching, or that the channel number included in the beacon frame is the same as the channel number of the channel currently used by the MP, the MP establishes connection with the counterpart MP on the channel currently used by the MP based on the information included in the beacon frame (S460).

Figure 5:
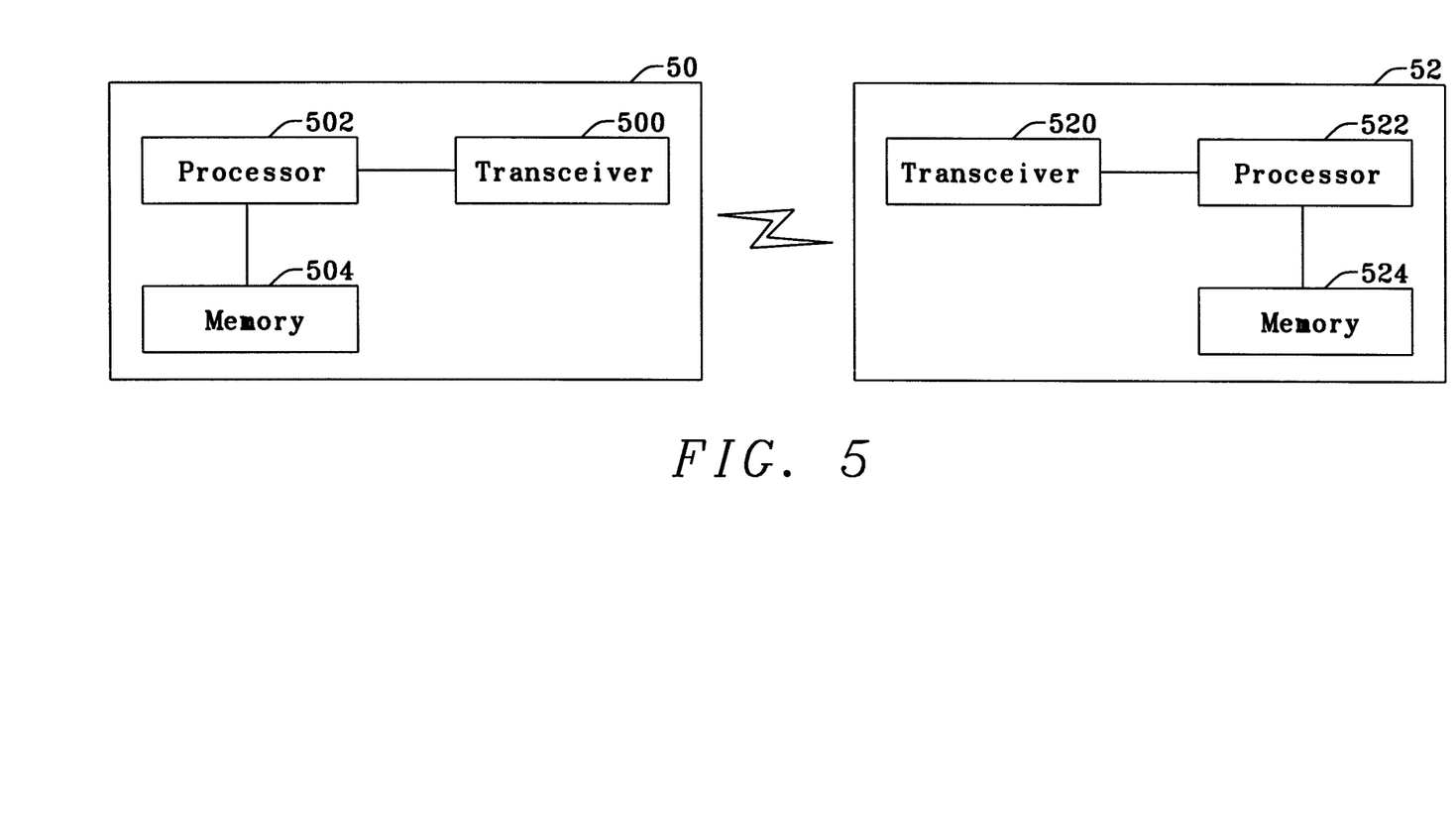
FIG. 5 is a schematic diagram of a device according to at least one embodiment of the present disclosure.

FIG. 5 is a schematic diagram of a device according to at least one embodiment of the present disclosure.

The first device 50 and the second device 52 are terminals capable of implementing the above-described embodiment, and they include all or some of transceivers 500, 520, processors 502, 522, and memories 504, 524. The first device 50 may be a device for transmitting a beacon frame, like an MP or an access point (AP). The second device 52 may be a device for receiving a beacon frame, like an MP or a station (STA).

The transceivers 500 and 520 may transmit and/or receive various frames, and they may implement physical layers such as, e.g., IEEE 802.11.

The processors 502 and 522 may be functionally connected to transceivers 500 and 520 to control the latter. The processors 502 and 522 may implement physical layers and/or MAC layers such as, e.g., IEEE 802.11.

The processor 502 may be implemented to perform the connection method according to at least one embodiment of the present disclosure described above in FIGS. 1 and 2. For example, the processor 502 may be configured to broadcast a first beacon frame over a first channel, to generate a second beacon frame including information on the first channel, and to broadcast the second beacon frame over a second channel that is different from the first channel. The processor 502 may be configured to establish a connection with the second device 52 on the first channel in response to the second beacon frame.

The processor 522 may be implemented to perform the connection method according to at least one embodiment of the present disclosure described above in FIGS. 1, and 4. For example, the processor 522 may be configured to receive a beacon frame over the second channel, to perform a channel switching to a first channel that is different from the second channel based on information included in the beacon frame, and to establish a connection with the first device 50 on the first channel. The processor 522 may be configured to broadcast the first beacon frame over the first channel after the switching to the first channel.

In short, the processors 502 and 522 may be implemented to practice the embodiments of the present disclosure described above.

The transceivers 500 and 520 and/or the processors 502 and 522 may include an application-specific integrated circuit (ASIC), other chipsets, logic circuits, and/or data processing devices.

The memories 504 and 524 may be coupled to the processors 502 and 522 to store various parameters.

The memories 504 and 524 may include read-only memory (ROM), random access memory (RAM), flash memory, memory cards, storage media, and/or other storage devices. When the embodiments are implemented by using software, the above-described technique may be implemented as modules (process, function, etc.) that perform the above-described functions. The modules may be stored in the memories 504 and 524 and executed by the processors 502 and 522. The memories 504 and 524 may be internal or external to the processors 502 and 522 and may be coupled to the processors 502 and 522 through various known interfaces.

According to some embodiments as described above, the present disclosure can interconnect devices that use different channels in a communication system utilizing the beacon frames as connection indicators.

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Various implementations of the systems and methods described herein may be realized through digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions to and from a storage system, at least one input device, and at least one output device, wherein the programmable processor may be a special-purpose processor or a general-purpose processor. Computer programs (which are also known as programs, software, software applications or code) contain instructions for a programmable processor and are stored in a "computer-readable recording medium."

The computer-readable recording medium refers to any computer program product, apparatus, and/or device (e.g., non-volatile or non-transitory recording medium such as CD-ROM, ROM, memory card, hard disk, an optical/magnetic disk, storage devices, and the like) used to provide instructions and/or data to a programmable processor.

Various implementations of the systems and techniques described herein can be realized by a programmable computer. Here, the computer includes a programmable processor, a data storage system (including volatile memory, nonvolatile memory, or any other type of storage system or a combination thereof) and at least one communication interface. For example, the programmable computer may be one of a server, a network device, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. A method for a device serving on a first channel to connect itself with a counterpart device serving on a channel different from the first channel, the method comprising:
   broadcasting a first beacon frame over the first channel;
   generating a second beacon frame including information on the first channel; and
   broadcasting the second beacon frame over each of second channels that are different from the first channel,
   wherein the first beacon frame is broadcasted when a current beacon time is within a first time section, and the second beacon frame is broadcasted when the current beacon time is within a second time section that is different from the first time section;
   wherein the second time section is set for each of the second channels, thereby allowing the second beacon frame to be transmitted to different second channels at different beacon times;
   wherein for each of the second channels, the second beacon frame is repeatedly broadcasted at a corresponding time interval;
   wherein generating of the second beacon frame comprises adding a channel switch information element to the first beacon frame; and
   wherein the second beacon frame Includes information used for establishing connection between the device and the counterpart device after the counterpart device switching to the first channel.

2. The method of claim 1, wherein the second beacon frame includes an information element that includes instructions for the counterpart device which received the second beacon frame over any one of the second channels to switch itself to the first channel.

3. The method of claim 2, further comprising:
   establishing a connection with the counterpart device on the first channel.

4. The method of claim 1, wherein the first time section is set based on a transmission time of a delivery traffic indication map (DTIM).

5. A device serving on a first channel and supporting connection with a counterpart device serving on a channel different from the first channel, the device comprising:
   a transceiver and a processor configured to control the transceiver,
   wherein the processor is configured
      to broadcast a first beacon frame over the first channel,
      to generate a second beacon frame including information on the first channel, and
      to broadcast the second beacon frame over each of second channels that are different from the first channel,
   wherein the first beacon frame is broadcasted when a current beacon time is within a first time section, and the second beacon frame is broadcasted when the current beacon time is within a second time section that is different from the first time section;
   wherein the second time section is set for each of the second channels, thereby allowing the second beacon frame to be transmitted to different second channels at different beacon times,
   wherein for each of the second channels, the second beacon frame is repeatedly broadcasted at a corresponding time interval;
   wherein generating of the second beacon frame comprises adding a channel switch information element to the first beacon frame; and
   wherein the second beacon frame includes information used for establishing connection between the device and the counterpart device after the counterpart device switching to the first channel.

6. The device of claim 5, wherein the second beacon frame includes an information element that includes instructions for the counterpart device which receives the second beacon frame over any one of the second channels to switch itself to the first channel.

7. The device of claim 6, wherein the processor is configured to establish a connection with the counterpart device on the first channel in response to the second beacon frame.

8. The device of claim 5, wherein the first time section is set based on a transmission time of a delivery traffic indication map (DTIM).

\* \* \* \* \*